United States Patent
Kim et al.

(10) Patent No.: US 9,722,672 B2
(45) Date of Patent: *Aug. 1, 2017

(54) WIRELESS COMMUNICATION DEVICE AND METHOD OF OPERATING THE SAME

(71) Applicant: Samsung Electronics Co., Ltd., Suwon-si, Gyeonggi-do (KR)

(72) Inventors: Jinwoo Kim, Seoul (KR); Junho Kim, Yongin-si (KR); Seok-Hyun Kim, Hwaseong-si (KR); Hangseok Choi, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/398,970

(22) Filed: Jan. 5, 2017

(65) Prior Publication Data

US 2017/0117942 A1  Apr. 27, 2017

Related U.S. Application Data

(63) Continuation of application No. 14/672,710, filed on Mar. 30, 2015, now Pat. No. 9,571,141.

(30) Foreign Application Priority Data

Apr. 11, 2014  (KR) .......................... 10-2014-0043679

(51) Int. Cl.
*H04B 5/00* (2006.01)
*H04B 1/10* (2006.01)

(52) U.S. Cl.
CPC ......... *H04B 5/0062* (2013.01); *H04B 1/1018* (2013.01)

(58) Field of Classification Search
CPC ... H04B 1/1018; H04B 5/0025; H04B 5/0062
USPC ........................................................ 455/41.1
See application file for complete search history.

(56) References Cited

U.S. PATENT DOCUMENTS

| | | | |
|---|---|---|---|
| 7,873,121 B2 | 1/2011 | Frederick et al. | |
| 7,907,005 B2 | 3/2011 | Kranabenter | |
| 8,182,754 B2 | 5/2012 | Yatsenko et al. | |
| 8,292,175 B2 | 10/2012 | Kim | |
| 8,390,430 B1 | 3/2013 | Sundstrom et al. | |
| 8,456,283 B2 | 6/2013 | Brauner et al. | |
| 8,606,212 B2 | 12/2013 | Sheikholeslami | |

(Continued)

*Primary Examiner* — Eugene Yun
(74) *Attorney, Agent, or Firm* — Harness, Dickey & Pierce P.L.C.

(57) ABSTRACT

A calibrator to process an output signal of an analog digital converter in a wireless communication device, the calibrator comprising a level filter to remove noise from the output signal of the analog digital converter using mask information regulating a signal level; a timing filter to remove pulses from the level-filtered signal that are beyond a reference duty ratio by using timing information; a pattern filter to remove pulses from the timing-filtered signal that are judged to not comprise a reference number of consecutive pulses by using pattern information; and a duty correction circuit to correct a duty of the pattern-filtered signal to improve performance of the wireless communication device by separately performing a filtering operation on noise and a damping component included in a normal signal.

20 Claims, 16 Drawing Sheets

(56) References Cited

U.S. PATENT DOCUMENTS

| | | |
|---|---|---|
| 2011/0064165 A1 | 3/2011 | Bae et al. |
| 2011/0206160 A1 | 8/2011 | Sung et al. |
| 2012/0083205 A1 | 4/2012 | Marcu et al. |
| 2013/0052948 A1 | 2/2013 | Fuchs |
| 2013/0109304 A1 | 5/2013 | Marcu et al. |
| 2013/0189926 A1 | 7/2013 | Bangs et al. |
| 2013/0210351 A1 | 8/2013 | Ling et al. |
| 2013/0237150 A1 | 9/2013 | Royston |
| 2015/0295622 A1* | 10/2015 | Kim .................. H04B 5/0025 455/41.1 |

* cited by examiner

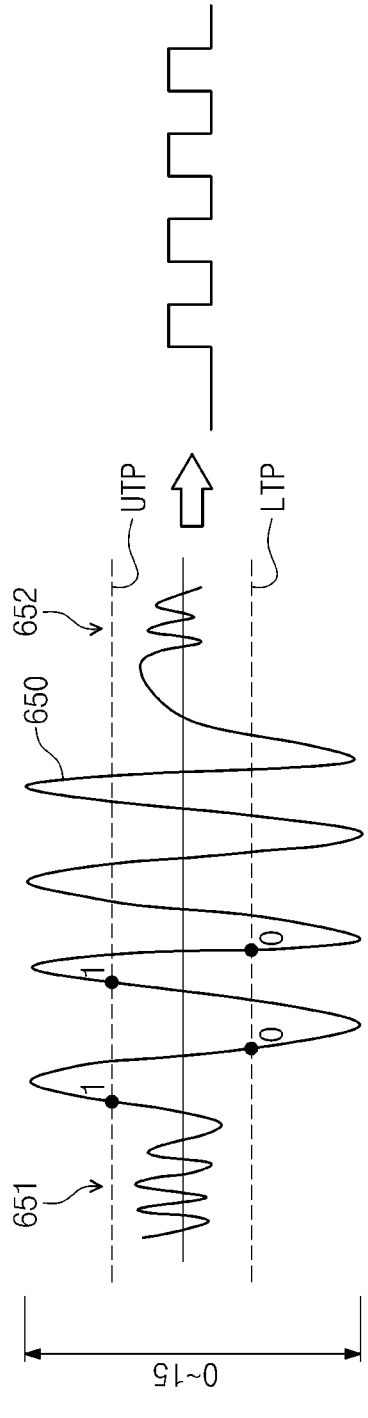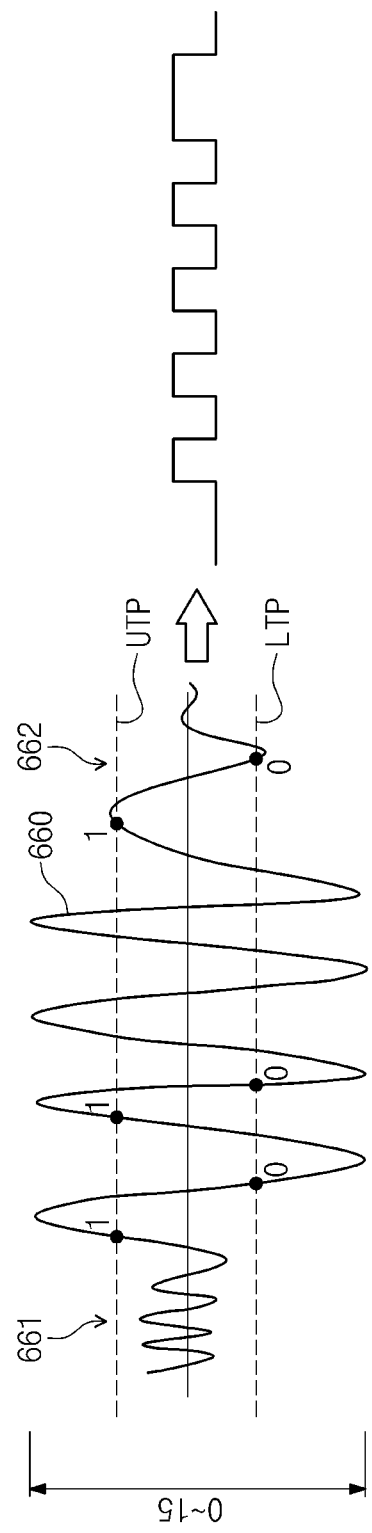

FIG. 8A
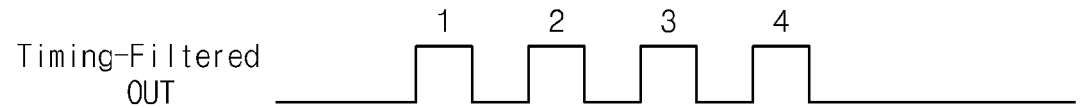
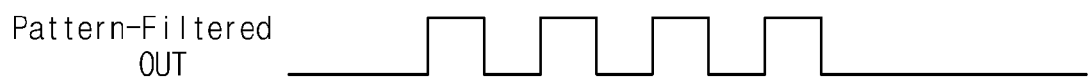
FIG. 8B
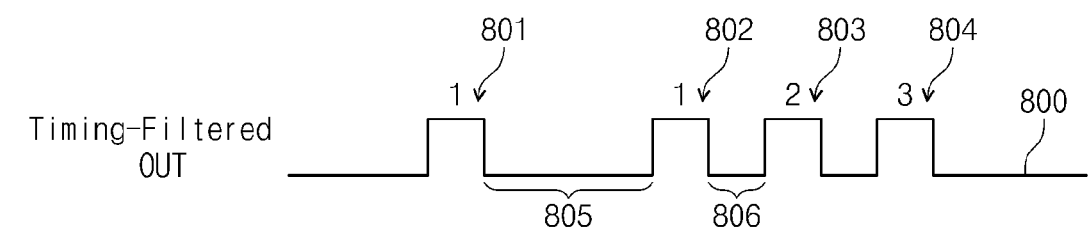
FIG. 8C
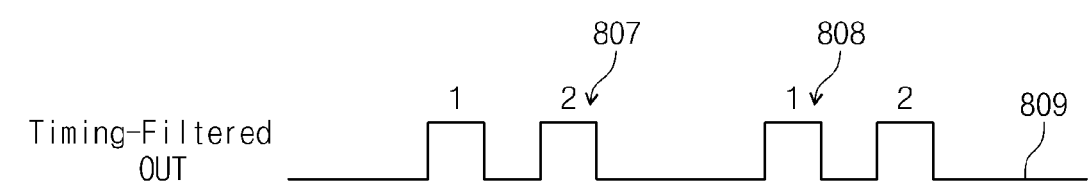

WIRELESS COMMUNICATION DEVICE AND METHOD OF OPERATING THE SAME

CROSS-REFERENCE TO RELATED APPLICATIONS

This application is a continuation of U.S. application Ser. No. 14/672,710, filed on Mar. 30, 2015, which claims priority under 35 U.S.C. §119 of Korean Patent Application No. 10-2014-0043679, filed on Apr. 11, 2014, the entire contents of each of which are hereby incorporated herein by reference.

BACKGROUND OF THE INVENTION

1. Field of the Invention

The present inventive concept herein relates to wireless communication devices, and more particularly, to a wireless communication device performing a near field communication (NFC) function.

2. Description of the Related Art

A NFC function is generally performed between a card and a reader. The card may be embedded in a mobile device, such as a smart phone, to perform a noncontact electronic communication, such as a payment.

A NFC protocol is one area of conventional radio frequency identification (RFID) and may operate a terminal with a built-in tag in an active mode. As a result, the NFC protocol may perform not only a tag function but also functions associated with a reader function of reading a tag, a writer function of inputting information in a tag, and peer-to-peer (P2P) functions between terminals.

The NFC protocol is prescribed by standards in an ISO 18092 and may perform a short-distance wireless communication using a signal of various frequencies including 125 kHz, 135 kHz, and 900 MHz as well as a frequency of 13.56 MHz. The NFC protocol may support a reader such as ISO 1223 TYPEA (Mifare), TYPEB, TYPEF (Felica), and ISO 15693 TYPEV, and a card such as TYPEA, TYPEB, TYPEF, and TYPEV.

Under various NFC protocols, transmission data may be source-coded in a predetermined coding method and then transmitted through a transmission channel, and a reception unit of a reader or a card receives various kinds of transmission signals as reception data. For example, in the case of a card of ISO 14443 TYPEA, a miller coding signal may be received as reception data. In the case of a reader of TYPEA, after a Manchester coding or a BSPK coding is performed, a signal, which is subcarrier load modulated in a subcarrier frequency, may be received. Also, in the case of a card of TYPEB, an NRZ coding signal may be received, and in the case of a reader of TYPEB, after a BPSK code, a signal, which is subcarrier load modulated in a subcarrier frequency, is received. In the case of a reader of ISO 15693, after a miller code, a signal which is subcarrier load modulated in a subcarrier frequency may be received. A communication speed of the reception data may include a distribution range of 26 kpbs through 847 kbps.

In the case of a reader supporting various NFC protocols, since the reader receives a signal of various frequencies, it is important to adaptively remove a noise according to a communication frequency. In the case of removing a noise by uniformly determining a level of mask information, not only a noise but also a damping component included in a wireless signal may not be properly filtered, and a normal signal that should not be removed may be filtered. Moreover, since a damping component increases according to a level of a signal, there is a limit to increase a communication distance. Thus, it is becoming an important issue to improve performance of a wireless communication device (for example, a NFC reader, or a smart phone including the NFC reader) by filtering both a noise and a damping component.

SUMMARY OF THE INVENTION

Embodiments of the inventive concept include a calibrator to process an output signal of an analog digital converter in a wireless communication device. The calibrator may include a level filter configured to generate a level-filtered signal by removing noise from the output signal of the analog digital converter by using mask information regulating a signal level. A timing filter is configured to generate a timing-filtered signal by removing from the level-filtered signal pulses that are beyond a reference duty ratio by using timing information. A pattern filter is configured to generate a pattern-filtered signal using pattern information by removing from the timing-filtered signal pulses that are judged to be one of a number of consecutive pulses that is less than a reference number of consecutive pulses. A duty correction circuit is configured to correct a duty of the pattern-filtered signal.

Embodiments of the inventive concept also include a method of operating a wireless communication device. The method may include filtering a level of a coded signal using mask information obtained by sampling a noise of the coded signal by an analog digital converter to generate a level-filtered signal. The method also includes generating a timing-filtered signal by removing pulses from the level-filtered signal that are beyond a reference duty ratio by using timing information. The method also includes generating a pattern-filtered signal by removing pulses from the timing-filtered signal that are judged to be one of a number of consecutive pulses that is less than a reference number of consecutive pulses. The method also includes correcting a duty of the pattern-filtered signal.

Embodiments of the inventive concept further include a calibrator of a wireless communication device. The calibrator includes a level filter to generate a level-filtered signal by filtering noise of an output signal of an analog-digital converter (ADC) based on an upper trigger point (UTP) and a lower trigger point (LTP). The calibrator also includes a timing filter to generate a timing-filtered signal by filtering the level-filtered signal based on timing information to remove a damping component and any noise not filtered by the level filter.

The calibrator may further include a pattern filter to generate a pattern-filtered signal by removing from the timing-filtered signal pulses that are judged to be one of a number of consecutive pulses that is less than a reference number of consecutive pulses.

The pattern filter may determine the number of consecutive pulses by counting a number of times an internal clock counts between rising edges of adjacent pulses of the timing-filtered signal.

The calibrator may also include a noise detector to detect the UTP and LTP of noise in a preamble period of the output signal of the ADC by using UTP and LTP information.

The calibrator may further include a multiplexer to select and output one of the level-filtered signal, the timing-filtered signal, and the pattern-filtered signal in response to receiving an output selection signal.

Additional features and utilities of the present invention will be set forth in part in the description which follows and, in part, will be obvious from the description, or may be learned by practice of the present invention.

BRIEF DESCRIPTION OF THE DRAWINGS

Features and utilities of various embodiments of the present inventive concept will become apparent and more readily appreciated from the following description of the various embodiments, taken in conjunction with the accompanying drawings, of which:

FIGS. 6A and 6B are drawings illustrating filtering methods of a level filter;

FIGS. 8A through 8C are drawings illustrating a method of removing a noise included in a timing-filtered signal using predetermined pattern information;

DETAILED DESCRIPTION OF THE INVENTION

Figure 1A:
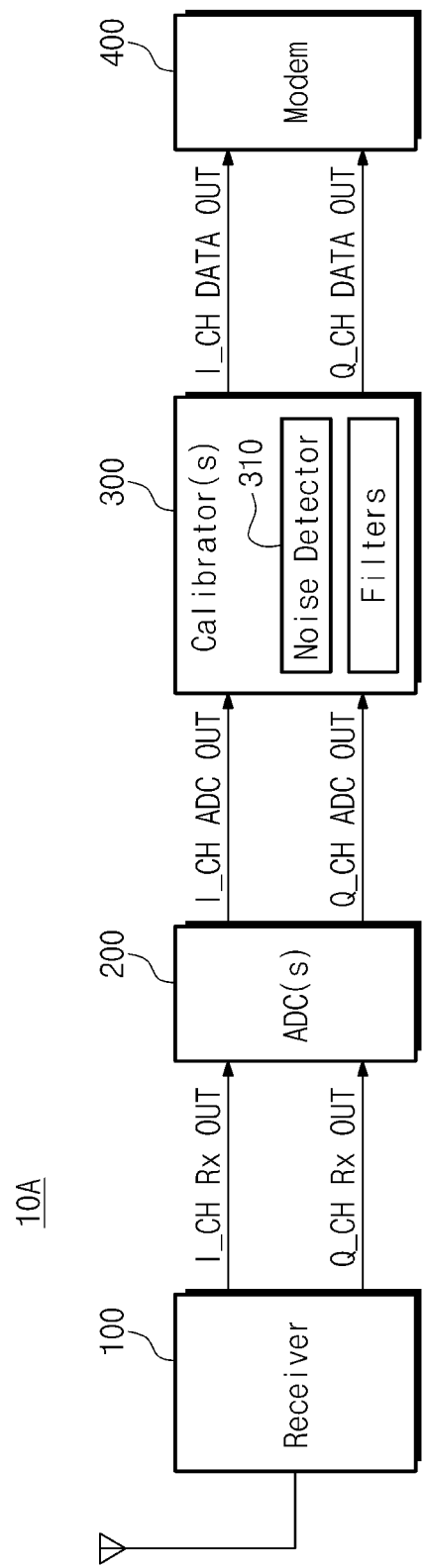
FIGS. 1A and 1B are block diagrams illustrating a wireless communication device in accordance with embodiments of the inventive concept.

Embodiments of the present general inventive concepts will be described more fully hereinafter with reference to the accompanying drawings. These inventive concepts may, however, be embodied in many different forms and should not be construed as limited to the various embodiments set forth herein. Rather, these embodiments are provided so that this disclosure will be thorough and complete, and will fully convey the scope of the inventive concepts to those skilled in the art. In the drawings, the size and relative sizes of layers and regions may be exaggerated for clarity. Like numbers refer to like elements throughout.

It will be understood that, although the terms first, second, etc. may be used herein to describe various elements, these elements should not be limited by these terms. These terms are only used to distinguish one element from another. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. It will also be understood that when an element such as a layer, region, or substrate is referred to as being "on" or "onto" another element, it may lie directly on the other element or intervening elements or layers may also be present. It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present.

Figure 1B:
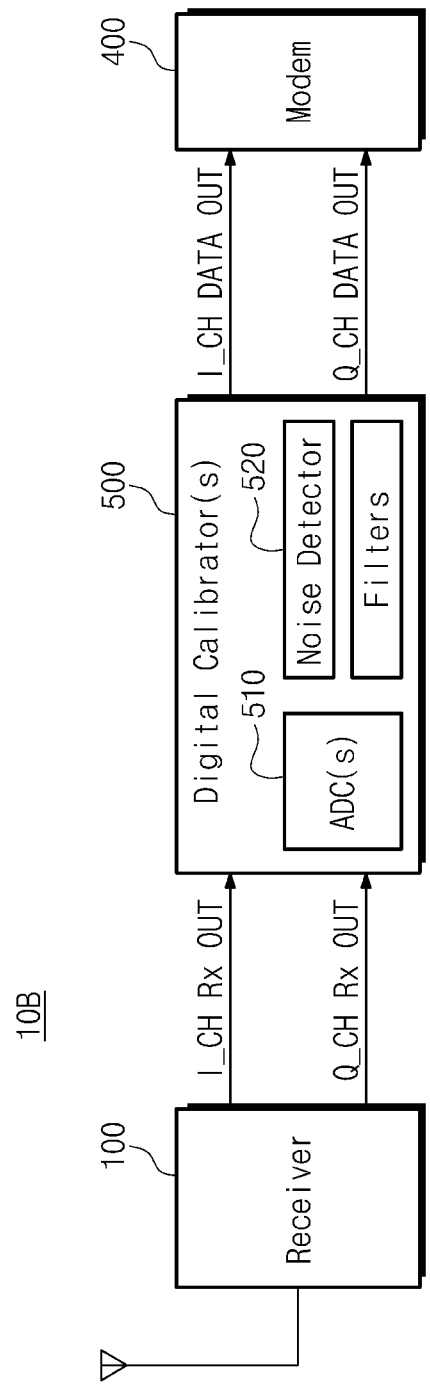
Figure 2:
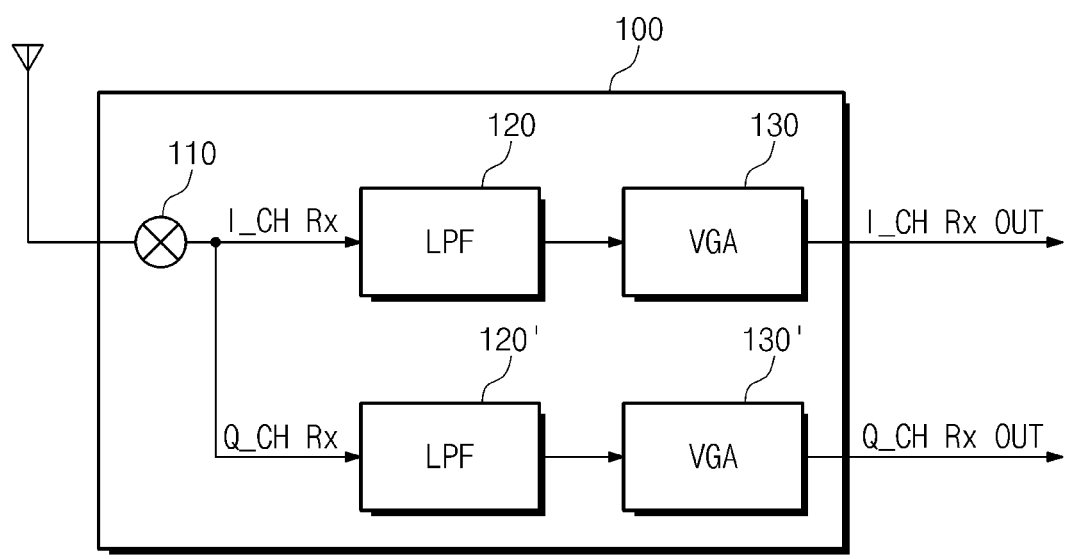
FIG. 2 is a block diagram illustrating a constitution of a receiver included in a wireless communication device in accordance with embodiments of the inventive concept.

FIGS. 1A and 1B are block diagrams illustrating examples of a wireless communication device 10A or 10B in accordance with embodiments of the inventive concept. FIG. 2 is a block diagram illustrating a constitution of a receiver included in a wireless communication device in accordance with embodiments of the inventive concept.

Referring to FIG. 1A, a wireless communication device 10A may have a near field communication (NFC) function. The wireless communication device may include an antenna, a receiver 100, an analog digital converter ADC 200, a calibrator 300 and a modem 400.

Referring to FIG. 2 in conjunction with FIG. 1A, the receiver 100 may include a mixer 110, low pass filters (LPF) 120 and 120', and variable gain amplifiers VGA 130 and 130' to process a signal received from an antenna.

The mixer 110 may remove a carrier wave from the received signal. One or more mixers 110 may be provided. The one or more mixers 110 are referred to throughout the specification as "mixer 110," although it is understood that the mixer 110 is not limited to a single mixer. In one embodiment, the mixer 110 includes a pair of mixers and the mixer 110 may generate an I-channel signal and a Q-channel signal. The I-channel signal may be an in-phase channel signal and the Q-channel signal may be a quadrature phase channel signal. The I-channel signal and the Q-channel signal may have a phase difference of 90° between them.

For example, referring to FIG. 2, low pass filters 120 and 120' may remove a noise included in signals I_CH Rx and Q_CH Rx, respectively, output from the mixer 110. Variable gain amplifiers 130 and 130' may amplify a signal that has weakened while being transmitted through air. The low pass filters 120 and 120' and variable gain amplifiers 130 and 130' may be provided to process the I-channel signal and the Q-channel signal, respectively.

Referring to FIG. 1A, the analog digital converter 200 may convert a signal I_CH Rx OUT and Q_CH Rx OUT output from the receiver 100 into a digital signal (e.g., ADC_DATA of FIG. 3) to transmit the digital signal to the calibrator 300. The analog digital converter 200 may be a 4-bit converter, but is not limited thereto. For example, the analog digital converter 200 may be configured to convert a signal between an analog signal and a digital signal having any number of bits.

The calibrator 300 may remove noise and a damping component included in the digitally-converted I-channel and Q-channel signals. Although FIGS. 1A and 1B illustrate a single calibrator 300, embodiments of the present invention are not limited thereto. For example, a pair of calibrators 300 may be provided to process the I-channel signal and the Q-channel signal, respectively. Referring to FIG. 1A, the calibrator 300 may include a noise detector 310 and a plurality of filters to remove both noise and a damping component. The filters may include a filter to remove noise using mask information formed by the noise detector 310, a filter to remove noise using timing information of a mask-filtered signal, and a filter to remove noise using pattern information of a timing-filtered signal. Embodiments of the inventive concept are not limited to the specific filters described above in that alternative filters may be provided so long as the concepts of the present invention are performed.

Referring to FIG. 1B, a digital calibrator 500 in a wireless communication device 10B, in accordance with embodiments of the inventive concept may be embodied by the digital converter 510.

More specifically, the digital calibrator 500 may include an analog digital converter 510, a noise detector 520, and filters, as illustrated in FIG. 1B, so that the digital calibrator 500 may be configured to, by itself, receive an analog signal to perform both a converting operation and a filtering operation therein. Although a single digital calibrator 500 is illustrated in FIG. 1B, embodiments of the present invention are not limited thereto. For example, a pair of digital calibrators 500 may be provided to process the I-channel signal and the Q-channel signal, respectively. The digital calibrator 500 is similar to the calibrator 300 illustrated in FIG. 1A except the digital calibrator 500 includes an analog digital converter 510 in order to perform a digital converting operation. Thus, detailed descriptions of overlapped parts have been omitted to be concise and avoid duplicate descriptions.

A wireless communication device in accordance with embodiments of the inventive concept separately performs a removal of noise included in a wireless signal, and a removal of damping components being generated immediately after consecutive pulses, as many as the number (for example, 4, 8, or more) prescribed in a protocol, are received. For example, a wireless communication device in accordance with embodiments of the inventive concept generates mask information using noise sampled in a preamble period and performs a level-filtering operation of removing noise using the mask information. A wireless communication device, in accordance with embodiments of the inventive concept may remove noise and a damping component by applying a level-filtering operation, a timing-filtering operation, and a pattern-filtering operation, respectively. Furthermore, a wireless communication device in accordance with embodiments of the inventive concept may correct a duty of filtered signals. As a result, problems similar to a communication distance reduction of an NFC reader or a wireless communication device including the NFC reader, which is caused by conventional processing methods of removing noise and a damping component at the same time, can be remedied.

Figure 3A:
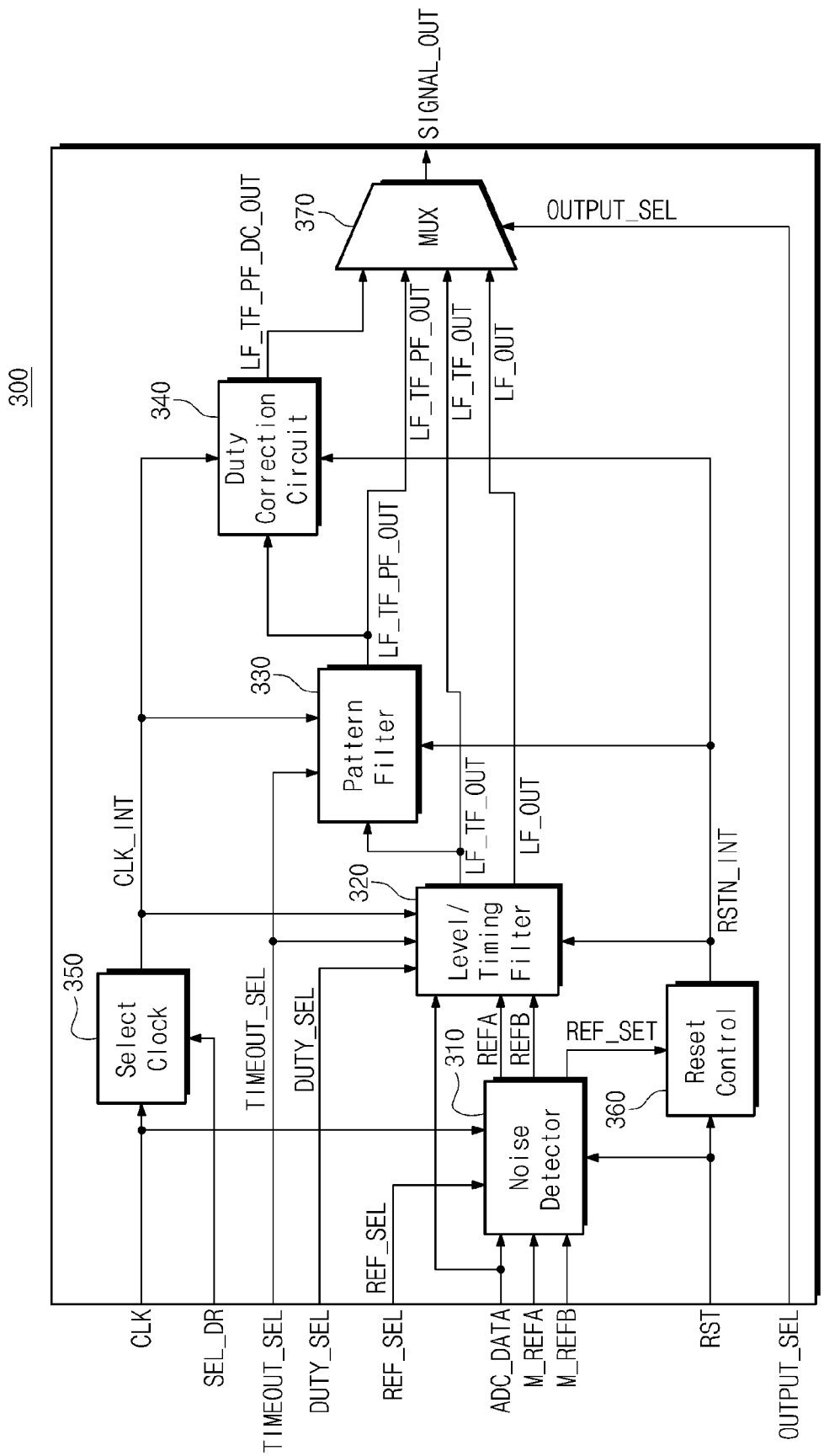
FIGS. 3A and 3B are block diagrams illustrating a calibrator of a wireless communication device in accordance with embodiments of the inventive concept.
Figure 3B:
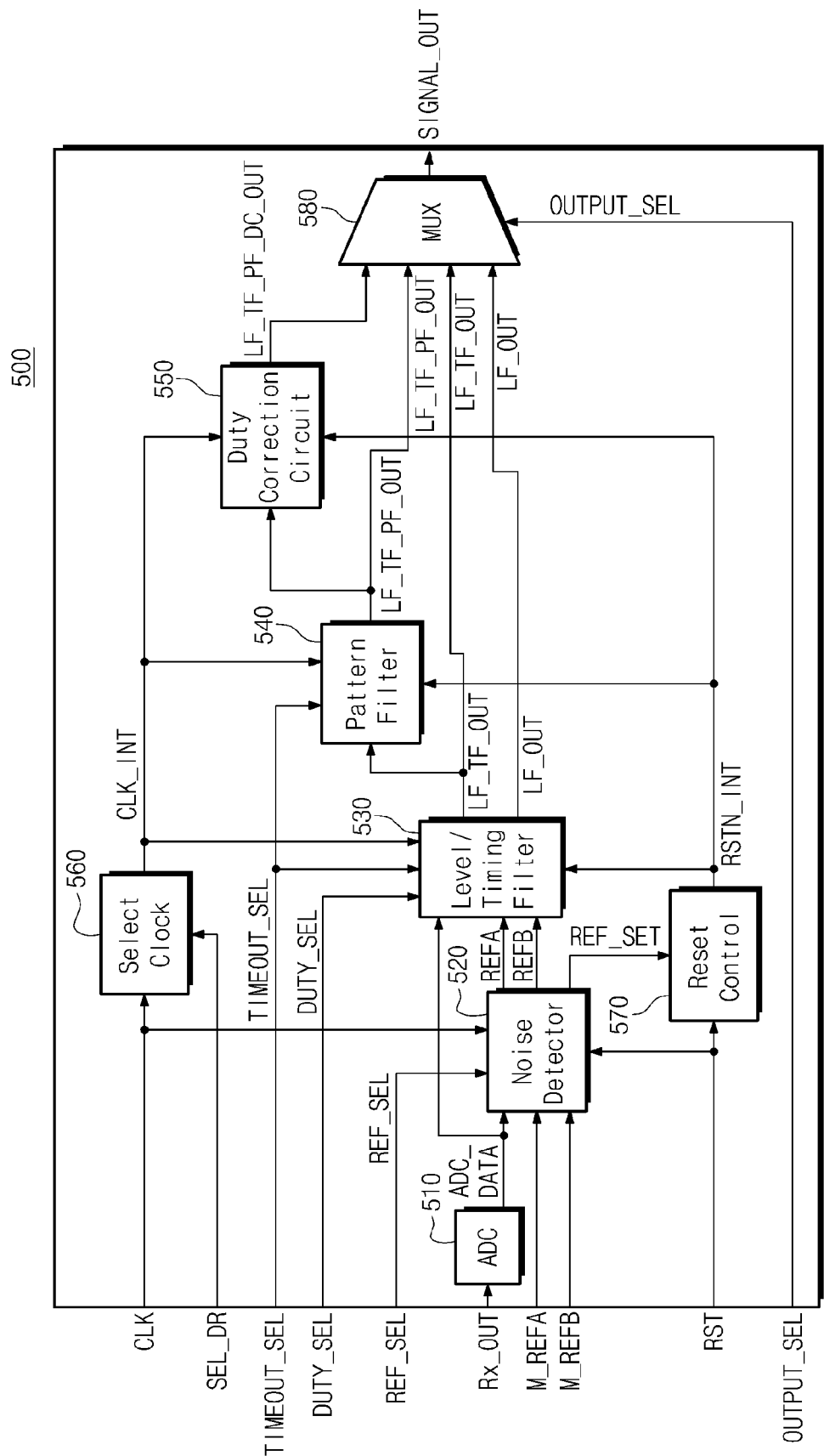
Figure 4:
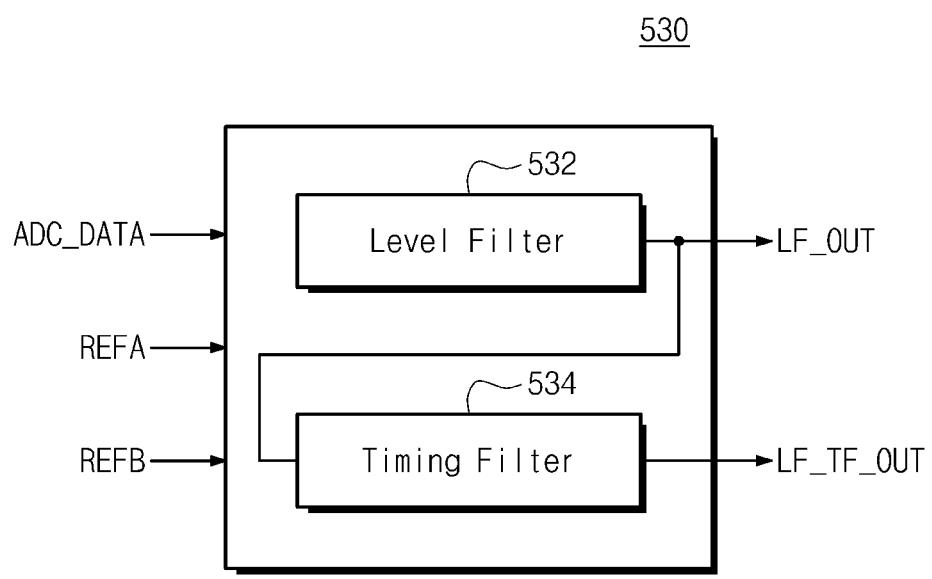
FIG. 4 is a block diagram illustrating a constitution of a level/timing filter of the calibrator illustrated in FIG. 3B.

FIGS. 3A and 3B are block diagrams illustrating a calibrator of a wireless communication device in accordance with embodiments of the inventive concept. FIG. 4 is a block diagram illustrating a constitution of a level/timing filter of the calibrator illustrated in FIG. 3B. The digital calibrator 500 illustrated in FIG. 3B is similar to the calibrator 300 illustrated in FIG. 3A except the digital calibrator 500 of FIG. 3B may perform a digital converting operation.

Referring to FIG. 3B, the digital calibrator 500 may include an analog-digital converter 510, a noise detector 520, a level/timing filter 530, a pattern filter 540, and a duty correction circuit 550. Filtering operations being performed in the digital calibrator 500 are described as follows.

The analog-digital converter 510 may convert an analog signal Rx_OUT, received from the receiver 100, into a digital signal. The analog-digital converter 510 may be a 4-bit converter, but is not limited thereto. For example, the analog-digital converter 200 may be configured to convert a signal between an analog signal and a digital signal having any number of bits.

The noise detector 520 may receive a digital-converted signal ADC_DATA from the analog digital converter 510. The noise detector 520 may also receive a reference select signal REF_SEL. The noise detector 520 may sample noise included in the digital-converted signal ADC_DATA to generate mask information REFA and REFB, and the generated mask information REFA and REFB may be used to remove noise from the signal. The sampling operation may be performed at intervals based on a main clock signal CLK. The noise detector 520 may transmit the generated mask information REFA and REFB to the level/timing filter 530.

The level/timing filter 530 may receive a duty select signal DUTY SEL, the generated mask information REFA and REFB, and the digitally converted signal ADC_DATA. The level/timing filter 530 may then remove noise of the digitally converted signal ADC_DATA, received from the analog digital converter 510, using the received mask information REFA and REFB, and may output a level-filtered signal LF_OUT and a timing-filtered signal LF_TF_OUT. For example, in reference to FIG. 4, the level/timing filter 530 may include a level filter 532 and a timing filter 534. The level filter 532 may remove noise of the digitally converted signal ADC_DATA received from the analog digital converter 510 using the mask information and output the level-filtered signal LF_OUT. The timing filter 534 may receive the level-filtered signal LF_OUT and perform an operation of removing noise of the level-filtered signal LF_OUT using predetermined timing information. The operation of removing noise using the predetermined timing information will be explained in more detail below in reference to FIGS. 3B and 7.

Referring to FIG. 3B, the pattern filter 540 may receive a timeout select signal TIMEOUT_SEL and the timing-filtered signal LF_TF_OUT, may remove noise of the timing-filtered signal LF_TF_OUT using predetermined pattern information, and may output a pattern-filtered signal LF_T-F_PF_OUT. The predetermined pattern information may be a characteristic or protocol of a signal received through the antenna. For example, assume a case of an NFC reader transmitting and receiving a radio wave using a TYPEA signal. If four, eight, or more than eight (the number of times prescribed in a protocol) consecutive pulses are input, the pulses may be determined to be a normal signal. If not, the pulses may be determined to be noise and, in response to determining that the pulses are a noise, the pattern filter 540 performs an operation of removing the pulses. By combining four consecutive pulses, eight consecutive pulses, and more than eight consecutive pulses, a digital signal like "1010110 . . . " may be restored. The pulses may be recognized as a normal signal in response to the number of times counted by an internal clock CLK_INT during a period between consecutive pulses being within a predetermined number (e.g., twenty). The predetermined number may be more than or less than twenty, as long as it is a positive integer, and may be determined based on localized factors, e.g., surrounding environment of a wireless communication device, strength of signal, etc. The internal clock CLK_INT may be selected by a selection clock circuit 560 on the basis of the main clock CLK. Frequencies of the internal clock CLK_INT and the main clock CLK may be equal to or different from each other depending on the type of a signal being transmitted and received by a wireless communication device.

The duty correction circuit 550 may receive the pattern-filtered signal LF_TF_PF_OUT from the pattern filter 540 to correct a duty. Even though the received signal has already been filtered through previous various filters, as discussed above, a duty of the pattern-filtered signal LF_TF_PF_OUT may not be accurate because the filtering operations may be performed with a certain margin. Thus, an operation to correct a duty may be performed after the signal has been filtered.

Referring to FIG. 3B, the digital calibrator 500 may further include the selection clock circuit 560 discussed above, a reset control circuit 570, and a multiplexer MUX 580.

The selection clock circuit 560 may receive a mode select signal SEL_DR controlling so that a mode in which a wireless communication device operates may be selected to determine an internal clock CLK_INT driving the wireless communication device. For example, in accordance with embodiments of the inventive concept, in response to a wireless communication device transmitting and receiving a TYPEA signal having a frequency of 848 kHz, an internal clock CLK_INT may be selected by the selection clock circuit 560 to have a frequency of 13.56 MHz. As another example, in accordance with embodiments of the inventive concept, in response to a wireless communication device transmitting and receiving an ISO 15693 signal, an internal clock CLK_INT may be selected by the selection clock circuit 560 to have a frequency of 6.78 MHz. In the examples above, a mode select signal SEL_DR, corresponding to a type of signal the wireless communication device transmits and receives, may be received by the selection clock circuit 560 to determine the internal clock CLK_INT. That is, a frequency of the internal clock CLK_INT being selected by the selection clock circuit 560 may be determined on the basis of a type of signal the wireless communication device transmits and receives.

The reset control circuit 570 may receive a reset signal RST and a reference set signal REF_SET to reset the level/timing filter 530, the pattern filter 540, and the duty correction circuit 550 by generating and outputting an internal reset control signal RSTN_INT to each of the level/timing filter 530, the pattern filter 540, and the duty correction circuit 550.

The multiplexer MUX 580 may receive the level-filtered signal LF_OUT, the timing-filtered signal LF_TF_OUT, the pattern-filtered signal LF_TF_PF_OUT, and the duty-corrected signal LF_TF_PF_DC_OUT. In response to an output selection signal OUTPUT_SEL, received by the MUX 580, a signal corresponding to the output selection signal OUTPUT_SEL is selected by the MUX 580 from among the received signals described above, and the selected signal may be output from the MUX 580 as an output signal SIGNAL_OUT. For example, in response to the pattern-filtered signal LF_TF_PF_OUT satisfying a standard quality, the MUX 580 may select the pattern-filtered signal LF_TF_PF_OUT and output it without being corrected by the duty correction circuit 550. This situation is the same for the level-filtered signal LF_OUT and the timing-filtered signal LF_TF_OUT. As a result, implementing the aforesaid can provide a reduction in unnecessary power consumption.

As discussed above, a wireless communication device, in accordance with embodiments of the present invention, may separately perform a removal of noise included in a wireless signal and a removal of damping components generated immediately after pulses, which continue as many as the number (e.g., 4, 8, or more) prescribed in a protocol, are received. As a result, problems similar to a communication distance reduction of an NFC reader or a wireless communication device including the NFC reader, which is caused by conventional processing methods of simultaneously removing a noise and a damping component at the same time, can be remedied.

Figure 5:
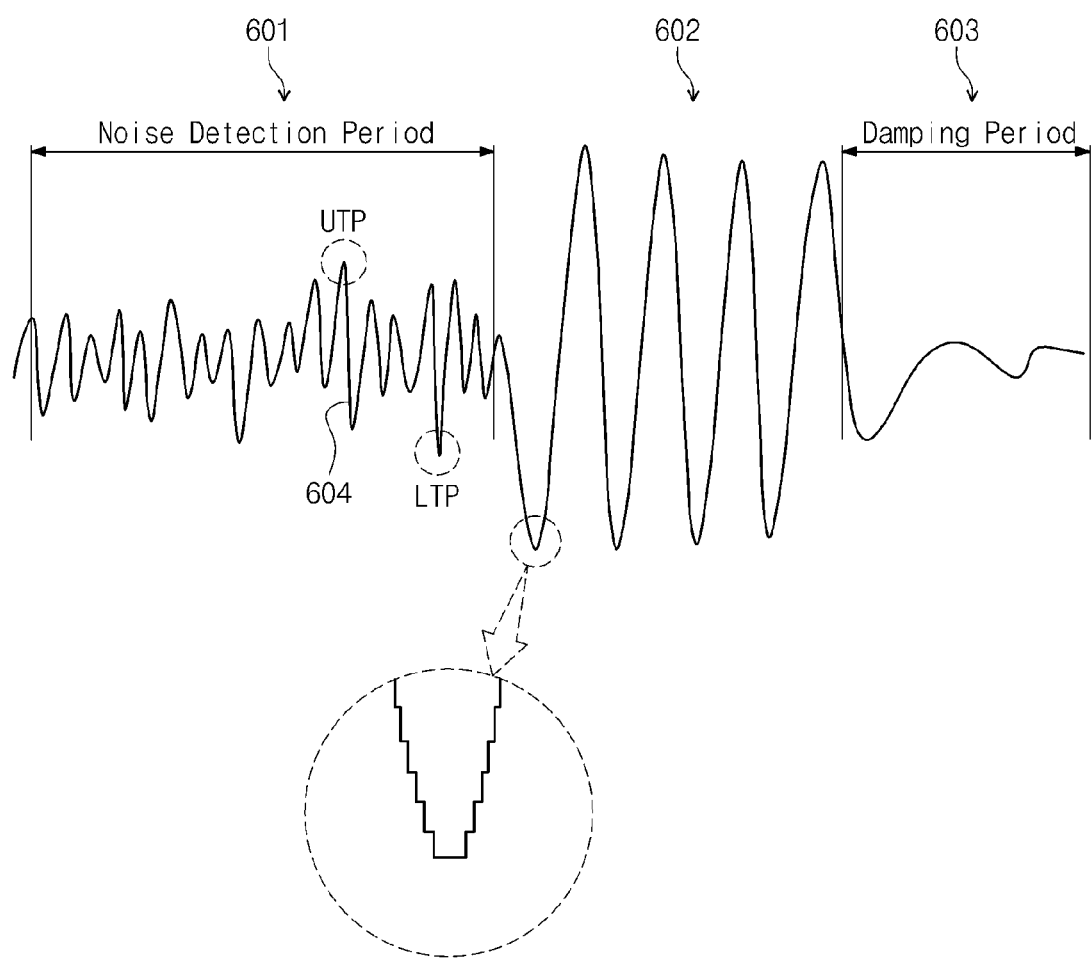
FIG. 5 is a waveform illustrating a noise existing in a noise sensing period located at an entrance of a wireless signal.

FIG. 5 is a waveform illustrating noise existing in a noise detection period 601 of the waveform 604. In embodiments of the inventive concept, the detection period 601 corresponds to an introduction period, a preamble period, or a pre-normal-signal period of the waveform 604 located at the beginning of a sensed segment of a wireless signal. The waveform 604 also includes a normal signal period 602, and a damping period 603 which corresponds to a conclusion period or a post-normal-signal period of the waveform 604. The waveform 604 illustrated in FIG. 5 is the digitally converted signal ADC_DATA, which is a digital signal that is input into the noise detector 520 by way of the analog digital converter 510 (refer to FIG. 3B). However, the waveform of FIG. 5 is roughly expressed and is provided for convenience to assist the reader in understanding the concepts related therewith.

An operation of the noise detector 520 is described as follows with reference to FIGS. 5 and 3B.

The noise detector 520 may detect noise included in a digital-converted signal ADC_DATA and may form mask information to remove the detected noise. Generally, in the case of performing a wireless communication, only noise is detected in the preamble period 601 immediately before the normal signal period 602 which includes communication information. In other words, when a system is configured to detect noise and damping in the preamble period 601, only noise is typically detected in the preamble period, not damping. The noise detector 520 may detect an upper trigger point (UTP) and a lower trigger point (LTP) of noise in the preamble period 601 (i.e. the noise detection period 601) using received UTP and LTP information M_REFA and M_REFB. Upon detecting the UTP and the LTP, the noise detector 520 generates and transmits mask information REFA and REFB to the level/timing filter 530. The mask information REFA and REFB may include all the UTP and LTP information M_REFA and M_REFB, respectively, or only a portion of the UTP and LTP information M_REFA and M_REFB, respectively. A sampling operation of detecting an UTP and a LTP of noise may be performed based on a main clock signal CLK. The operations described above are to remove noise included in a normal signal by filtering signals between an UTP and a LTP among signals in the noise detection period 601 (i.e., the preamble period 601). The information REFA and REFB may include information of the UTP and the LTP of the noise detected by the noise detector 520.

In a case in which a level of a noise of a signal is too low, it may be necessary to primarily remove a damping component of a wireless signal, such as ADC_DATA. Here, the noise detector 520 may generate the mask information REFA and REFB using the received UTP and LTP information M_REFA and M_REFB. In this case, M_REFA and M_REFB signals are directly transmitted to the level/timing filter 530, or in other words, in this case REF_A and REF_B are the same as M_REFA and M_REFB, respectively. The UTP and LTP information M_REFA and M_REFB may be received from outside the calibrator (e.g., from a modem or an application processor).

FIGS. 6A and 6B are drawings illustrating a filtering method of a level filter in accordance with embodiments of the inventive concept. Waveforms 650 and 660, as illustrated in FIGS. 6A and 6B, are representative of a digital signal ADC_DATA output from an analog digital converter. However, the waveforms 650 and 660 are roughly expressed for convenience in order to easily assist a reader in understanding the concepts related therewith. The signal ADC_DATA may be a signal output from a 4-bit analog digital converter, but the present invention is not limited thereto. For example, the signal ADC_DATA may be a signal output from an analog-digital converter configured to convert a signal between an analog signal and a digital signal having any number of bits.

The level filter 532, in reference to FIG. 4, may filter noise included in the signal ADC_DATA received from the analog digital converter 510 using information REFA and REFB of a filter mask received from the noise detector 520. As described above, the mask information REFA and REFB may include information about the UTP and the LTP in each noise detection period, such as the noise detection periods 651 and 661 of FIGS. 6A and 6B. That is, a signal existing between the UTP and the LTP, or in other words a signal having an amplitude between UTP and LTP, may be considered as noise, and may be filtered accordingly.

The level filter 532 may generate an output signal LF_OUT of 1 bit. For example, the LF_OUT signal may be generated based on a hysteresis comparison operation performed by the level filter 532. For example, a period from where a rising curve of the ADC_DATA crosses the UTP to where a falling curve of the ADC_DATA crosses the LTP may be recognized as a digital signal "1". Similarly, a period from where a falling curve of the ADC_DATA crosses the LTP to where a rising curve of the ADC_DATA crosses the UTP may be recognized as a digital signal "0". In other words, an ADC_DATA signal that is level-filtered by using the mask information REFA and REFB may be output as a digital signal of 1 bit.

When the level filter 532 performs a filtering operation, a damping component 652 may be removed, as illustrated in FIG. 6A. However, as illustrated in FIG. 6B, it is possible for a damping component 662 to pass the bounds of the UTP and the LTP of the mask information and therefore be recognized as a normal signal. As such, when a damping component 662 is recognized as a normal signal, as in FIG. 6B, a damping component 662 and noise 661 may be removed by a timing-filtering operation, as described in more detail below.

Figure 7A:
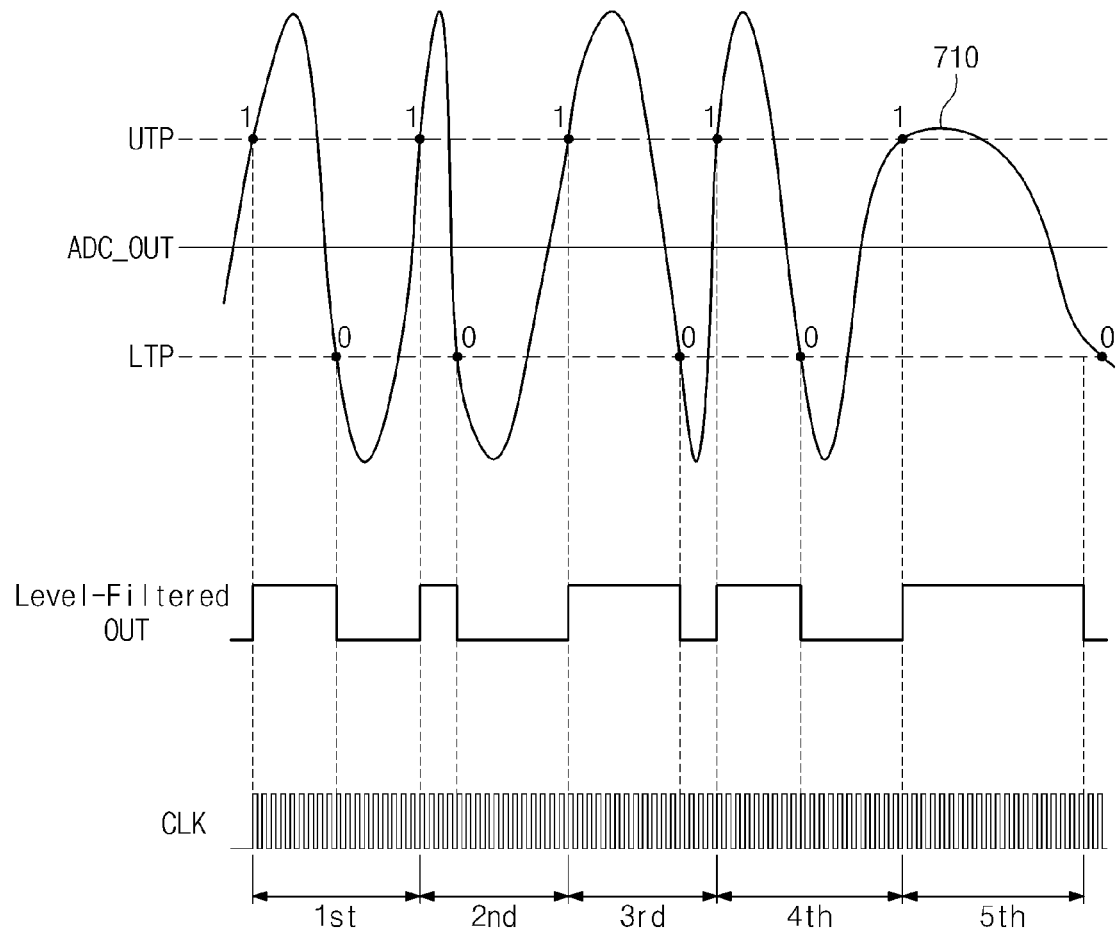
FIGS. 7A and 7B are drawings illustrating a method of removing a noise included in a level-filtered signal using predetermined timing information.
Figure 7B:
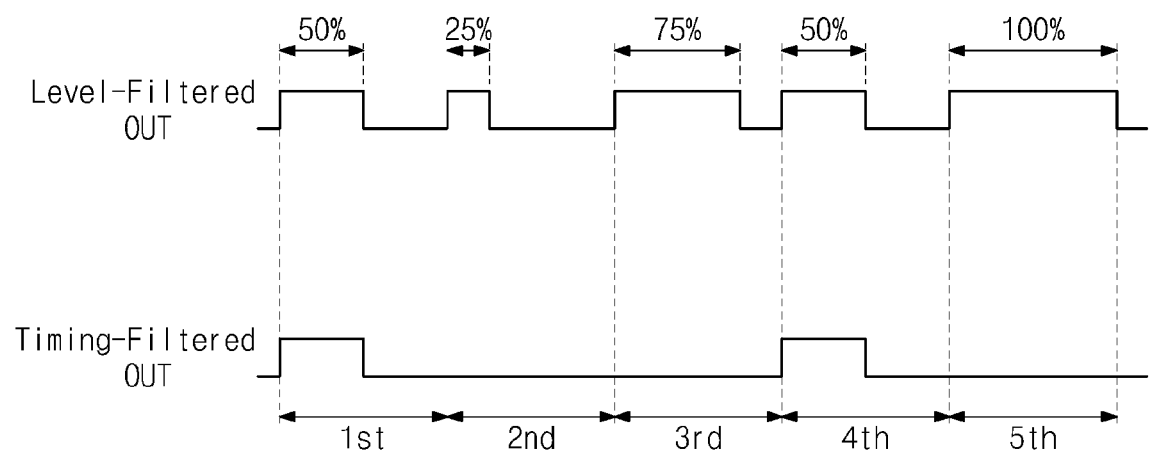

FIGS. 7A and 7B are drawings illustrating a method of removing noise and a damping component included in a level-filtered signal using predetermined timing information in accordance with embodiments of the inventive concept.

As discussed above, it may be possible that a damping component and noise may not be removed even though a level-filtering operation is performed on an ADC_DATA from an analog digital signal. This may be due to the amplitude of a damping component passing the bounds of the mask information, or due to noise existing in a period other than the preamble period and passing the bounds of the mask information.

For example, assume that a wireless communication device, including an NFC reader in accordance with embodiments of the inventive concept, transmits and receives a TYPEA signal having a frequency of 848 kHz. At this time, a level-filtered signal LF_OUT may be counted by an internal clock CLK_INT having a frequency of 13.56 MHz. It may be determined whether the level-filtered signal LF_OUT is a normal signal by referring to a ratio of logic high to logic low included in one period of the level-filtered signal LF_OUT. In this example, since 13.56 MHz divided by 848 kHz is 16, the TYPEA signal may be counted 16 times by the internal clock CLK_INT during one period of the TYPEA signal. Thus, in response to the level-filtered signal LF_OUT being counted 16 times by the internal clock CLK_INT during one period of the level-filtered signal LF_OUT, and a ratio of the logic high to the logic low being 1:1 during one period of the level-filtered signal LF_OUT, the level-filtered signal LF_OUT may be determined to be a normal signal.

However, since a minimal change may occur in an input/output timing of all sorts of signals depending on constitution and complexity of a circuit, a small margin or tolerance may be input. For example, in response to the number of times counted by the internal clock CLK_INT being equal to or less than a predetermined number (e.g., twenty times), the level-filtered signal LF_OUT may be determined to be a normal signal. Alternatively, in response to the number of times being counted by the internal clock CLK_INT being greater than a predetermined number (e.g., twenty times), a predetermined logic value, such as a logic low value, may be forcibly output regardless of the actual value of a signal waveform. This is because the standard of judgment for a normal signal may be set based on whether the number of times counted by the internal clock CLK_INT is within a predetermined number, e.g., twenty. The aforesaid is illustrated in FIG. 7A with respect to the 5th damping period. Here, although the number of times counted by an internal clock CLK_INT is twenty-two times in a logic high period of a damping period (5th), the level-filtered signal may be set to "0" after being counted only twenty times. In other words, a logic high value "1" may be output for the first twenty times counted by an internal clock CLK_INT, and a logic low value "O" may be forcibly output for the two times counted after the first twenty, regardless of the value of the signal waveform, as illustrated in FIG. 7A.

Since a ratio of logic high to logic low cannot be accurately 1:1 due to minimal change of input/output timing of all sorts of signals according to a constitution of the circuit, when the ratio is within a predetermined range, the level-filtered signal LF_OUT may be determined to be a normal signal. For example, when a ratio (i.e., duty ratio) of a level high counted by the internal clock CLK_INT is within 30~70% in one period of a pulse of the level-filtered signal LF_OUT, the level-filtered signal LF_OUT may be determined to be a normal signal. However, the ratio may be variously and selectively set based on a quality of a signal, a communication environment, etc. Thus, according to embodiments of the inventive concept, noise and damping may be filtered from a signal waveform as the signal waveform is converted from an analog signal to a digital signal. The filtering of the noise and damping may be performed by determining whether a duty ratio of the waveform signal is within a predetermined range (e.g. 30%~70%), and forcing values of the digital signal to predetermined logical states based on the determination that the duty ratio is within the predetermined range.

Referring to FIGS. 7A and 7B, a ratio of logic high to logic low counted by the internal clock CLK_INT in a first period is 9:9 and a ratio (i.e., a duty ratio) of logic high is 50%. A ratio of logic high to logic low in a second period is 4:12 and a ratio (i.e., a duty ratio) of logic high is 25%. A ratio of logic high to logic low in a third period is 12:4 and a ratio (i.e., a duty ratio) of logic high is 75%. A ratio of logic high to logic low in a fourth period is 10:10 and a ratio (i.e., a duty ratio) of logic high is 50%. A ratio of logic high to logic low in a damping period, i.e., the fifth period, is 20:0 and a ratio (i.e., a duty ratio) of logic high is 100%.

As illustrated in FIG. 7A, although the level-filtered signal LF_OUT is originally counted twenty-two times in a logic high period of a damping period, i.e., the fifth period 710, as described above, a logic low value may be forcibly output at a time when the number of times counted becomes twenty times. That is, with respect to the level-filtered signal LF_OUT, only the signals in the first and fourth periods are determined to be a normal signal, whereas the signals in the second period, the third period, and the damping period (the fifth period) may be determined to be noise (i.e., a damping component, which may be considered to be a particular type of noise for purposes of description). The timing-filtered signal LF_TF_OUT may be transmitted to the pattern filter 540 (refer to FIG. 3B).

FIGS. 8A through 8C are drawings illustrating a method of removing noise included in a timing-filtered signal using predetermined pattern information. Referring to FIG. 3B, pattern-filtering operation may be performed by the pattern filter 540. The pattern filter 540 may receive a timing-filtered signal LF_TF_OUT and may remove noise of the timing-filtered signal LF_TF_OUT using predetermined pattern information.

The predetermined pattern information may be determined by a characteristic or protocol of a signal received through an antenna. For example, in one embodiment, a near field communication (NFC) reader transmits and receives a TYPEA signal. Here, as illustrated in FIG. 8A, when four consecutive pulses are input within predetermined intervals, the pulses being input may be determined to be a normal signal. However, if as illustrated in FIG. 8B or 8C, four consecutive pulses are not input within predetermined intervals, the pulses being input may be determined to be noise. For example, referring to FIG. 8B, an interval 805 between a first pulse 801 and a second pulse 802 is greater than a predetermined interval 806 between the second pulse 802 and a third pulse 803, and between the third pulse 803 and a fourth pulse 804. While an embodiment has been described in which four consecutive pulses define a normal signal, this is only an example, and embodiments of the inventive concept encompass determining that a signal is a normal signal, and not noise, based on any predetermined number of consecutive pulses.

Whether the pulses being input are consecutive pulses may be determined by referring to the number of times counted by the internal clock CLK_INT. For example, in the case that a wireless communication device transmits and receives a TYPEA signal having a frequency of 848 kHz, a frequency of the internal clock CLK_INT may be 13.56 MHz. If the internal clock CLK_INT counts sixteen times per one period of a pulse of the TYPEA signal, it may be determined that consecutive pulses are input. However, a minimal difference may occur in an input timing of a clock depending on a design, complexity, etc. of a circuit. In other words, an interval between pulses defining a normal signal may include a predetermined range of values to account for design requirements and complexity of a circuit. For example, in the case that the number of times counted by the internal clock CLK_INT is within a predetermined number (e.g., twenty), it may be determined that consecutive pulses are input.

In the case of FIG. 8B, since the number of times counted by the internal clock CLK_INT from a rising edge of a first pulse 801 of a timing-filtered signal 800 to a rising edge of a second pulse 802 of the timing-filtered signal 800 exceeds twenty times, it may be determined that the pulses 801 and 802 are non-consecutive. Even though three consecutive pulses are input from a second pulse 802 to a fourth pulse 804, the three-consecutive pulses being input may not be determined to be a normal signal because four consecutive pulses are not input. Consequently, signals such as those illustrated in FIG. 8B may be determined to be noise and, accordingly, filtered (removed) by the pattern-filtering operation.

Similarly, even in the case of FIG. 8C, since the number of times counted by the internal clock CLK_INT between a rising edge of a second pulse 807 of a timing-filtered signal 809 and a rising edge of a third pulse 808 of the timing-filtered signal 809 exceeds twenty times, it may be determined that non-consecutive pulses are input. Thus, signals such as those illustrated in FIG. 8C may be determined to be noise and, accordingly, filtered (removed) by the pattern-filtering operation.

Figure 9:
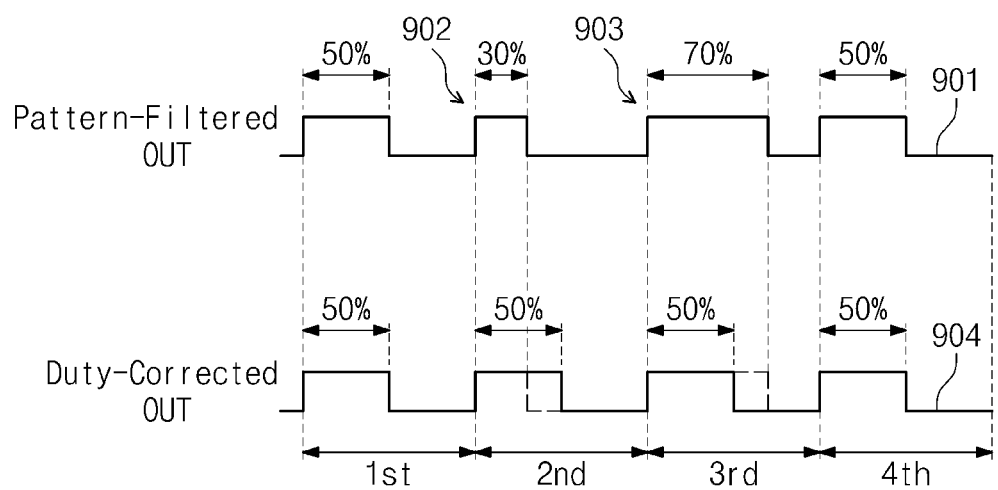
FIG. 9 is a drawing illustrating a process of correcting a duty of a pattern-filtered signal.

FIG. 9 is a drawing illustrating a method of correcting a duty of a pattern-filtered signal. In the level-filtering, timing-filtering, and pattern-filtering methods described above, since at least one filtering operation may be performed with some margins (e.g., if the number of times counted by the internal clock is within twenty, it may be determined to be a normal signal), a duty of a pattern-filtered signal LF_TF_PF_OUT may not be accurately 50%. Thus, an operation of correcting a duty may be performed. As illustrated in FIG. 9, second 902 and third 903 pulses of the pattern-filtered signal 901 are corrected to have a duty of 50% in the duty-corrected signal 904. For example, the duty correction circuit 550 (refer to FIG. 3B) may be configured to receive the pattern-filtered signal LF_TF_PF_OUT from the pattern filter 540 to correct a duty thereof. As illustrated in FIG. 9, for example, the second pulse 902 is corrected to increase the logic high value of the patterned-filtered signal from 30% to 50%, and the third pulse 903 is corrected to decrease the logic high value of the patterned-filtered signal from 70% to 50%.

Figure 10:
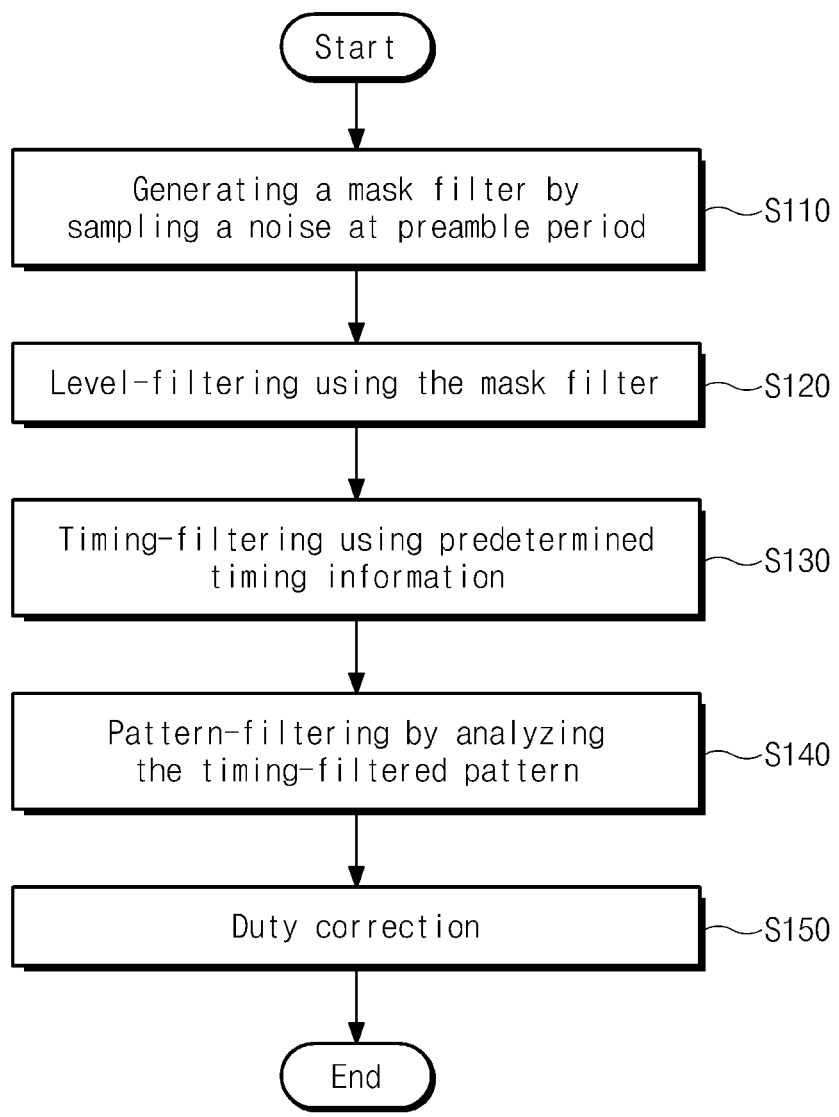
FIG. 10 is a flow chart illustrating filtering operations of a wireless communication device in accordance with embodiments of the inventive concept.

FIG. 10 is a flow chart illustrating filtering operations of a wireless communication device in accordance with embodiments of the inventive concept.

In operation S110, mask information may be generated. The mask information may be generated by sampling a preamble period of an output ADC_OUT of an analog-digital converter, such as the analog-digital converter 510 of FIG. 3B. Information about an upper trigger point (UTP) and lower trigger point (LTP) of noise may be obtained through a sampling process.

In operation S120, a level-filtering operation may be performed. The level-filtering operation may be performed using the mask information generated in operation S110. In the level-filtering operation, a signal existing between the UTP and the LTP may be considered as noise to be filtered. For example, a period from a position at which a rising edge of an ADC_DATA crosses the UTP to a position at which a falling edge of the ADC_DATA crosses the LTP may be recognized as "1". Similarly, a period from a position at which a falling edge of the ADC_DATA crosses the LTP and a position at which a rising edge of the ADC_DATA crosses the UTP may be recognized as "0". A digital signal of 1 bit may be output by the level-filtering operation.

In operation S130, a timing-filtering operation may be performed. The timing-filtering operation may remove noise, a damping component, or both, which have not been removed by the level-filtering operation. The timing-filtering operation may be performed by referring to a ratio of logic high to logic low among the number of times counted by the internal clock CLK_INT per one pulse of a level-filtered output. For example, in response to a ratio of the counting number in the logic high to logic low in a single period exceeding 30~70%, the level-filtered signal LF_OUT may be determined to be noise to be removed. That is, in response to a ratio of the counting number of the logic high to logic low being less than 30% or more than 70%, the level-filtered signal LF_OUT may be determined to be noise, and when a ratio of the counting number of logic high to logic low in a single period is within a range of 30% to 70%, the level-filtered signal LF_OUT may be determined to be a normal signal. However, the ratio may be variously set based on a quality of a signal, a communication environment, etc., and is not limited to the range of 30%~70% described according to one embodiment.

In an operation S140, a pattern-filtering operation may be performed. For example, if a predetermined number of consecutive pulses is detected (such as four, eight, or more consecutive pulses), the pulses being input may be determined to be a normal signal. However, as discussed above, the number of consecutive pulses required to determine a normal signal is dependent upon a type of signal the wireless communication device transmits and receives.

In an operation S150, an operation of correcting a duty with respect to the pattern-filtered signal may be performed. Since a filtering operation is performed with some margins in the filtering steps above, the pattern-filtered signal may not have an accurate duty ratio, such as a duty ratio of 50% according to one embodiment.

Figure 11:
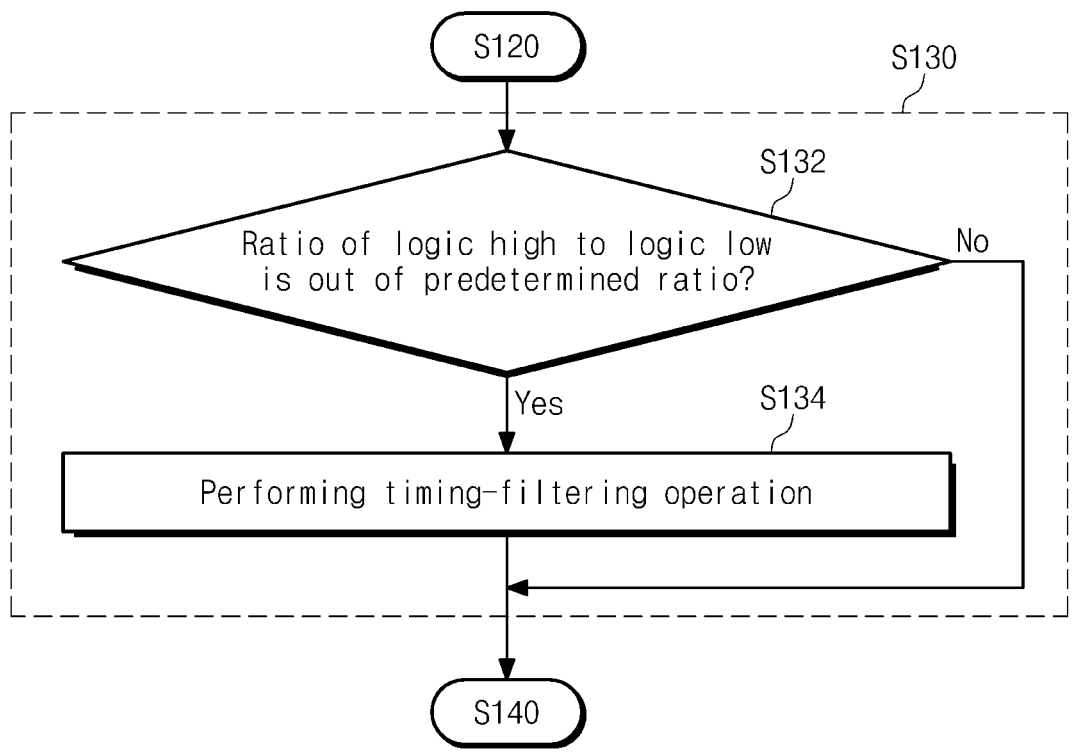
FIG. 11 is a flow chart illustrating an illustrative operation of the timing-filtering operation illustrated in FIG. 10.

FIG. 11 is a flow chart illustrating the timing-filtering operation performed in operation S130 illustrated in FIG. 10.

Referring to FIG. 11, in operation S132 it may be determined whether a ratio of logic high to logic low included in a level-filtered signal by an internal clock CLK_INT exceeds a predetermined ratio. According to one embodiment, assuming that a NFC reader transmits and receives a TYPEA signal having a frequency of 848 kHz and the internal clock CLK_INT operates at 13.56 MHz, the level-filtered signal may be counted sixteen times per its one period by the internal clock CLK_INT. Among sixteen pulses, if a ratio of pulses corresponding to the logic high and the logic low is 1:1, the level-filtered signal may be determined to be a normal signal. However, since a minimal change may occur in an input/output timing of all sorts of signals depending on constitution and complexity of a circuit, a small margin or tolerance may be provided to allow for a number of pulses within a predetermined range less than sixteen or more than sixteen. An operation branch may occur according to a judgment result. More specifically, when a ratio of the logic high to the logic low does not exceed a predetermined ratio (No), the level-filtered signal may be determined to be a normal signal. Alternatively, when a ratio of the logic high to the logic low does exceed a predetermined ratio (Yes), the procedure goes to operation S134.

In operation S134, a timing-filtering operation may be performed. If a ratio of the logic high to logic low exceeds a predetermined percentage, such as 30~70% according to one embodiment, among the number of times counted by the internal clock CLK_INT, the timing-filtering operation may be performed. That is, in response to a ratio of the counting number of the logic high to logic low being less than 30% or more than 70%, a timing-filtering operation on the level filtered signal LF_OUT may be performed by the timing filter 534 (refer to FIG. 4). In addition, in response to a ratio of the counting number of the logic high to logic low being within the range of 30~70%, a timing-filtering operation on the level filtered signal LF_OUT may not be performed. While a ratio of 30%~70% has been provided by way of example, the ratio may be variously set based on a quality of a signal, a communication environment, etc.

Figure 12:
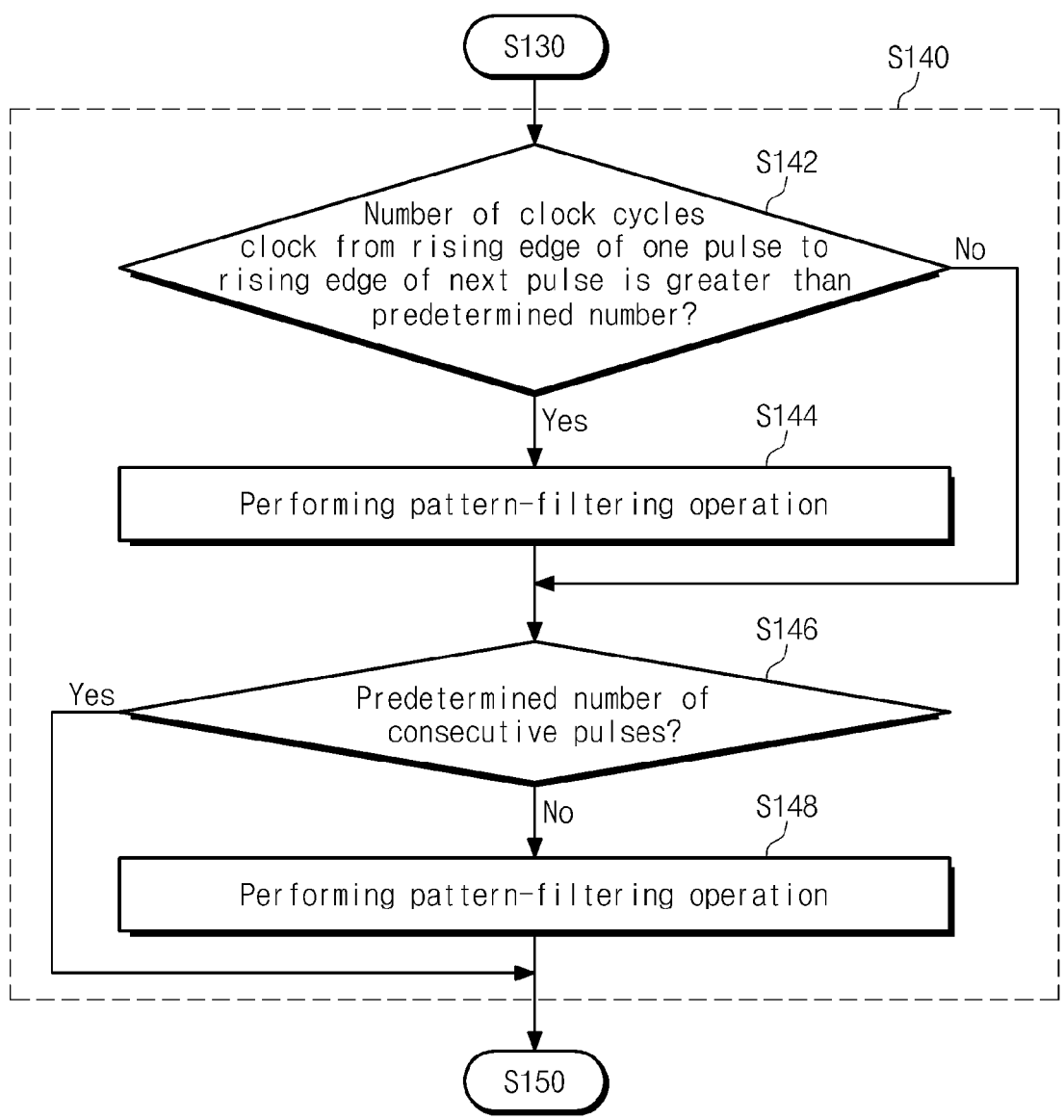
FIG. 12 is a flow chart illustrating an illustrative operation of the pattern-filtering operation illustrated in FIG. 10.

FIG. 12 is a flow chart illustrating a pattern-filtering operation, such as described in operation S140 of FIG. 10.

Referring to FIG. 12, in operation S142, it may be determined whether the number of times counted by an internal clock CLK_INT exceeds a predetermined number of times between a rising edge of a pulse of a timing-filtered signal and a rising edge of a next pulse of the timing-filtered signal. The aforesaid may be used to judge whether pulses being counted by the internal clock CLK_INT correspond to a normal signal.

For example, according to one embodiment a TYPEA signal having a frequency of 848 kHz is transmitted and received, and a frequency of the internal clock CLK_INT is 13.56 MHz. At this time, if the TYPEA signal is counted sixteen times per its one period of a pulse of the TYPEA signal by the internal clock CLK_INT, it may be determined that consecutive signals are input and thereby the received signals are determined to be a normal signal. However, it is understood that since a minimal change may occur in an input timing of the pulse, depending on constitution and complexity of a circuit, a small margin may be provided, such that a number of pulses within a predetermined range of sixteen may be used to define a normal signal. For example, in the case that the number of times counted by the internal clock INT_CLK is within a predetermined number (e.g., twenty), it may be determined that consecutive signals are input and thereby those signals are determined to be a normal signal. An operation branch may occur according to a judgment result. If the number of times counted exceeds the predetermined number of times, the procedure goes to operation S144. Alternatively, if the number of times counted does not exceed the predetermined number of times, the procedure goes to operation S146.

In operation S144, a pattern-filtering operation may be performed. If the number of times counted from a rising edge of a first pulse of the timing-filtered signal to a rising edge of a second pulse of the timing-filtered signal exceeds a predetermined number of times (e.g., twenty times), the first pulse may be determined to be noise and be filtered accordingly.

In operation S146, it may be determined whether a predetermined number of consecutive pulses exist, such as four consecutive pulses according to one embodiment. This is the case of transmitting and receiving a TYPEA signal, and, even in the case that eight pulses exist, those pulses may be determined to be a normal signal. In the case of transmitting and receiving other types of signals, the number of consecutive pulses, which is a reference of judging whether the received signal is a normal signal, may vary based on the type of signal and other design considerations. Whether the pulses are consecutive may be determined depending on whether the number of times that a period between rising edges of adjacent pulses is counted by the internal clock CLK_INT exceeds a predetermined number of times (e.g., twenty times according to one embodiment). An operation branch occurs according to a judgment result. If the predetermined number of consecutive pulses exists (Yes), the pattern-filtering operation is over. If the predetermined number of consecutive pulses does not exist (No), the procedure goes to operation S148.

In operation S148, a pattern-filtering operation may be performed. As discussed above, even if the pattern-filtering operation is performed in operation S144, pulses other than the prescribed number of consecutive pulses may be determined to be noises.

In FIG. 12, a first filtering operation is performed by judging the number of times counted between rising edges of adjacent pulses and a second filtering operation is performed by judging whether a predetermined number of consecutive pulses exist. However, the pattern-filtering operation may be performed by various methods, and the inventive concept is not limited to the specific example of the pattern-filtering operation described above. For example, if the number of times counted from a rising edge of a pulse to a rising edge of the next pulse exceeds a predetermined number (e.g., twenty according to one embodiment), operation S144 may be skipped and only one pattern-filtering operation may be performed by judging whether a predetermined number of consecutive pulses exist.

According to an embodiment in which an NFC reader has a calibrator embodied therein, and an embodiment in which a wireless communication device includes the NFC reader, a removal of noise included in a wireless signal and a removal of a damping component located at a terminal of a wireless signal may be separately performed. In other words, a wireless communication device, that performs a NFC function and comprises a calibrator in accordance with embodiments of the inventive concept, may separately remove a noise and a damping component included in a wireless signal. As a result, problems, such as a communication distance reduction of an NFC reader or a wireless communication device including the NFC reader, which is caused by conventional processing methods of simultaneously removing a noise and a damping component at the same time, may be solved.

Figure 13:
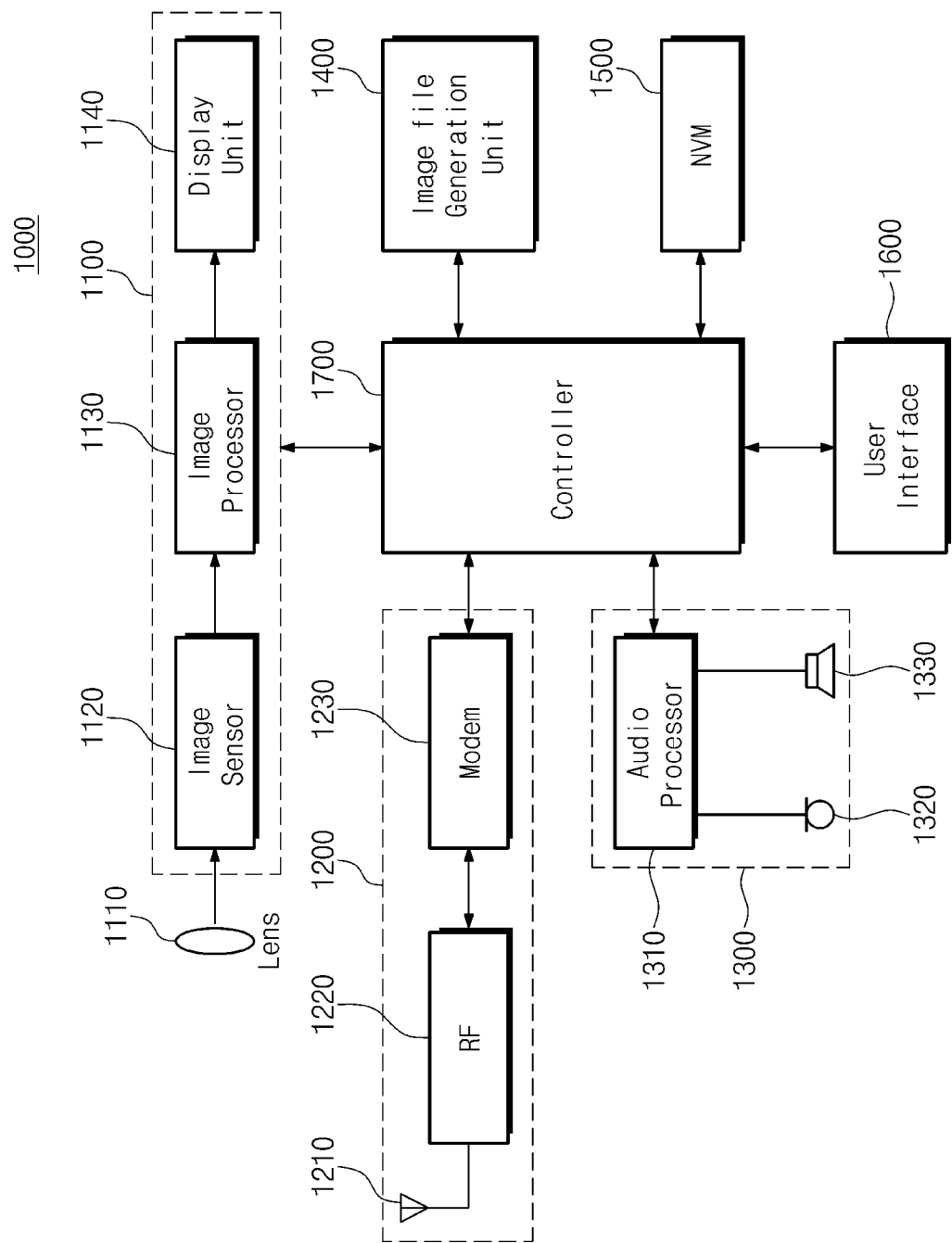
FIG. 13 is a block diagram illustrating a portable terminal, to which a wireless communication device in accordance with embodiments of the inventive concept is applied.

FIG. 13 is a block diagram illustrating a portable terminal to which a wireless communication device in accordance with embodiments of the inventive concept is applied. Referring to FIG. 13, a portable terminal 1000 including an NFC reader in accordance with embodiments of the inventive concept may include an image processing unit 1100, a wireless transmission and reception unit 1200, an audio processing unit 1300, an image file generation unit 1400, a nonvolatile memory device 1500, a user interface 1600, and a controller 1700.

The image processing unit 1100 may include a lens 1110, an image sensor 1120, an image processor 1130, and a display unit 1140. The wireless transmission and reception unit 1200 may include an antenna 1210, an RF unit 1220, and a modem 1230. The NFC reader may be embodied in the RF unit 1220 and may be embodied in various forms. For example, the NFC reader may be embodied in a wireless communication device or embodied in a portable electrical device to perform wireless communication. The audio processing unit 1300 may include an audio processor 1310, a microphone 1320, and a speaker 1330.

The nonvolatile memory device 1500 may be provided by a memory card (MMC, eMMC, SD, micro SD). The controller 1700 may be provided by a system on chip (SoC) driving an application program, an operating system, etc. A kernel of an operating system being driven in the system on chip may include a device drive to control an input/output scheduler and the nonvolatile memory device 1500. The device driver may control access performance of the nonvolatile memory device 1500 with reference to the number of synchronizing queue being managed in an input/output scheduler or may control a CUP mode, a DVFS level, etc.

The nonvolatile memory device 1500 and/or the memory controller may be mounted using various types of packages such as, for example, PoP (package on package), ball grid array (BGA), chip scale package (CSP), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline (SOIC), shrink small outline package (SSOP), thin small outline (TSOP), thin quad flatpack (TQFP), system in package (SIP), multi chip package (MCP), wafer-level fabricated package (WFP), and wafer-level processed stack package (WSP).

According to embodiments of the inventive concept, by separately performing a filtering operation on noise and a damping component included in a normal signal, the overall performance of an NFC reader and a wireless communication device including the NFC reader can be improved.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A calibrator of a wireless communication device, comprising:
   a first filter configured to generate a first-filtered signal by filtering one or both of noise and damping of an output signal of an analog-digital converter (ADC) based on an upper trigger point (UTP) and a lower trigger point (LTP); and
   a second filter configured to generate a second-filtered signal by filtering the first-filtered signal, based on timing information and based on a result of comparing pulses of the first-filtered signal with a timing clock signal, and configured to remove one or both of noise and damping from the first-filtered signal.

2. The calibrator of claim 1, wherein the second filter comprises a timing filter configured to remove, from the first-filtered signal, pulses that have a duty ratio out of a range of a reference duty ratio.

3. The calibrator of claim 1, wherein the second filter comprises a pattern filter configured to remove, from a digital signal that is based on the first-filtered signal, pulses that are ones of a plurality of consecutive pulses that is less than a reference number of consecutive pulses.

4. The calibrator of claim 1, further comprising a duty correction circuit configured to correct a duty of the second-filtered signal.

5. The calibrator of claim 1, further comprising a multiplexer configured to select and output one of the first-filtered signal and the second-filtered signal in response to receiving an output selection signal.

6. A reader for supporting one or more Near Field Communication (NFC) protocols, comprising:
   a receiver configured to receive a signal from an antenna and to process the signal; and
   a calibrator configured to process an output signal of an analog-digital converter, the calibrator comprising:
      a first filter configured to generate a first-filtered signal by filtering one or both of noise and damping of the output signal based on an upper trigger point (UTP) and a lower trigger point (LTP); and
      a second filter configured to generate a second-filtered signal by filtering the first-filtered signal based on timing information and based on a result of comparing pulses of the first-filtered signal with a timing clock signal, and configured to remove one or both of noise and damping from the first-filtered signal.

7. The reader of claim 6, wherein the second filter comprises a timing filter configured to remove, from the first-filtered signal, pulses that have a duty ratio out of a range of a reference duty ratio.

8. The reader of claim 6, wherein the second filter comprises a pattern filter configured to remove, from a digital signal that is based on the first-filtered signal, pulses that are ones of a plurality of consecutive pulses that is less than a reference number of consecutive pulses.

9. The reader of claim 6, further comprising a duty correction circuit configured to correct a duty of the second-filtered signal.

10. The reader of claim 6, further comprising a multiplexer configured to select and output one of the first-filtered signal and the second-filtered signal in response to receiving an output selection signal.

11. The reader of claim 6, wherein the upper trigger point (UTP) and the lower trigger point (LTP) are obtained by sampling the output signal to generate mask information.

12. The reader of claim 6, wherein the analog-digital converter is provided in the calibrator.

13. A mobile device, comprising:
an antenna; and
a Near Field Communication (NFC) reader configured to support one or more NFC protocols, the NFC reader comprising:
 a receiver configured to receive a signal from an antenna and to process the signal;
 an N-bit analog-digital converter configured to convert the signal into a first digital signal and to output the first digital signal; and
 a calibrator configured to process the first digital signal, wherein the calibrator includes:
  a first filter configured to generate a first-filtered signal by filtering one or both of noise and damping of the first digital signal based on an upper trigger point (UTP) and a lower trigger point (LTP); and
  a second filter configured to generate a second-filtered signal by filtering the first-filtered signal based on timing information and based on a result of comparing pulses of the first-filtered signal with a timing clock signal, and configured to remove one or both of noise and damping from the first-filtered signal.

14. The mobile device of claim 13, wherein the N-bit analog-digital converter is provided in the calibrator.

15. The mobile device of claim 13, wherein the N is four.

16. The mobile device of claim 13, wherein the second filter comprises a timing filter configured to remove, from the first-filtered signal, pulses that have a duty ratio out of a range of a reference duty ratio.

17. The mobile device of claim 13, wherein the second filter comprises a pattern filter configured to remove, from a second digital signal that is based on the first-filtered signal, pulses that are ones of a plurality of consecutive pulses that is less than a reference number of consecutive pulses.

18. The mobile device of claim 13, further comprising a duty correction circuit configured to correct a duty of the second-filtered signal.

19. The mobile device of claim 13, further comprising a multiplexer configured to select and output one of the first-filtered signal and the second-filtered signal in response to receiving an output selection signal.

20. The reader of claim 13, wherein the upper trigger point (UTP) and the lower trigger point (LTP) are obtained by sampling the output signal to generate mask information.

* * * * *